US006507409B2

(12) United States Patent
Kawaguchi

(10) Patent No.: US 6,507,409 B2
(45) **Date of Patent: *Jan. 14, 2003**

(54) METHOD FOR CONTROLLING INFORMATION RELATING TO THE STATE OF USE IN A PRINTING APPARATUS, AND A PRINTING APPARATUS

(75) Inventor: Koichiro Kawaguchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,282

(22) Filed: Apr. 15, 1997

(65) Prior Publication Data

US 2002/0057447 A1 May 16, 2002

(30) Foreign Application Priority Data

Apr. 17, 1996 (JP) ........................................ 8-095725

(51) Int. Cl.[7] ........................................ G06F 15/00

(52) U.S. Cl. ..................... 358/1.16; 358/1.8; 358/1.12; 358/1.14; 358/434; 347/5; 347/20; 347/37

(58) Field of Search ............................ 395/113; 347/7; 358/502, 296, 1.14, 1.16

(56) References Cited

U.S. PATENT DOCUMENTS

| | | | | | |
|---|---|---|---|---|---|
| 5,068,806 | A | | 11/1991 | Gatten et al. | 395/113 |
| 5,210,823 | A | * | 5/1993 | Moroi | 395/116 |
| 5,699,090 | A | * | 12/1997 | Wade et al. | 347/7 |
| 5,706,411 | A | * | 1/1998 | McCormick et al. | 395/113 |
| 5,714,989 | A | * | 2/1998 | Wade | 347/14 |
| 5,727,135 | A | * | 3/1998 | Webb et al. | 395/113 |
| 5,745,662 | A | * | 4/1998 | Nagata et al. | 395/113 |
| 5,774,136 | A | * | 6/1998 | Barbehenn et al. | 347/7 |

FOREIGN PATENT DOCUMENTS

| | | |
|---|---|---|
| EP | 0345060 | 12/1989 |
| EP | 0685768 | 12/1995 |

OTHER PUBLICATIONS

Pat. Abs. Jp., vol. 13, No. 267 (M–840), Jun. 20, 1989 (JP 01 069376 A).

Pat. Abs. JP., vol. 18, No. 576, (M–1697), Nov. 4, 1994 (JP 06 210934 A).

Pat. Abs. Jp., vol. 16, No. 187 (M–1244), May 7, 1992 (JP 04 025465 A).

Pat. Abs. Jp., vol. 13, No. 47 (P/822), Feb. 3, 1989 (JP 63 241630 A).

Pat. Abs. Jp., vol. 17, No. 74 (M–1366), Feb. 15, 1993 (JP 04 275156 A).

* cited by examiner

*Primary Examiner*—Jose L. Couso
*Assistant Examiner*—Gregory Desire
(74) *Attorney, Agent, or Firm*—Fitzpatrick Cella Harper & Scinto

(57) ABSTRACT

A printing apparatus can process all information relating to past states of use of the printing apparatus and appropriately notify the user of the state of use of the printing apparatus. A number of used recording sheets in the printing apparatus is accumulated as a number of passed sheets, and the user is notified of the accumulated number of used sheets and an average number of used sheets during a predetermined time period, in accordance with a command to confirm the number of passed sheets from the user. By also notifying the user of the amount of used consumable supplies, such as ink and the like, the user can be made aware of the frequency of required exchange or replenishment of each of the consumable supplies. By automatically notifying the user of information relating to the state of use of the recording apparatus when the number of recording operation of the apparatus has exceeded a guaranteed amount, the user can know when it is time to exchange the apparatus itself or various components of the apparatus.

26 Claims, 10 Drawing Sheets

17

| HEAD : | YELLOW | MAGENTA | CYAN | BLACK |
|---|---|---|---|---|
| GUARANTEED NUMBER OF INK DISCHARGING OPERATIONS : | 1,000,000 | 1,000,000 | 1,000,000 | 1,000,000 |
| TOTAL NUMBER OF INK DISCHARGING OPERATIONS : | 8,000 | 7,300 | 9,200 | 18,500 |

FIG.5

17

| HEAD : | YELLOW | MAGENTA | CYAN | BLACK |
|---|---|---|---|---|
| GUARANTEED NUMBER OF INK DISCHARGING OPERATIONS : | 1,000,000 | 1,000,000 | 1,000,000 | 1,000,000 |
| TOTAL NUMBER OF INK DISCHARGING OPERATIONS : | 820,500 | 750,000 | 850,000 | 1,000,000 |

THE BLACK HEAD HAS ATTAINED THE GUARANTEED NUMBER OF INK DISCHARGING OPERATIONS.

FIG.6

17

| INK TANK : | YELLOW | MAGENTA | CYAN | BLACK |
|---|---|---|---|---|
| NUMBER OF EXCHARGING OPERATIONS : | 6 | 4 | 5 | 13 |
| PERIOD OF USE : | 92 DAYS (ABOUT 3 MONTHS) | 92 DAYS (ABOUT 3 MONTHS) | 92 DAYS (ABOUT 3 MONTHS) | 92 DAYS (ABOUT 3 MONTHS) |
| AVERAGE NUMBER OF USED TANKS PER MONTH : | 2 | 1.3 | 1.7 | 4.3 |

FIG.7

METHOD FOR CONTROLLING INFORMATION RELATING TO THE STATE OF USE IN A PRINTING APPARATUS, AND A PRINTING APPARATUS

BACKGROUND OF THE INVENTION

1. Field of the Invention

This invention relates to a printing apparatus, and more particularly, to a printing apparatus and method capable of processing various kinds of information relating, for example, to the amount of use of sheets of a printing medium, a recording material or the like, or to life of a recording head, and notifying the user of the obtained information.

2. Description of the Related Art

Recently, various kinds of printing apparatuses have been practially used as output apparatuses for copiers, facsimile apparatuses, word processors and the like, and printers, connected to information processing systems, such as personal computers or the like, for outputting results. There are also various kinds of printing methods. For example, a method of transferring ink onto a recording medium using an ink sheet coated with the ink, an ink-jet method of forming an ink image on a recording medium by discharging ink droplets from discharging ports of a recording head, and an electrophotographic method of transferring a toner image formed on a photosensitive member onto a recording medium are widely known.

Particularly, the ink-jet method has been widely adopted recently because the configuration of a printing apparatus using that method is simple and a color print can be easily obtained.

Printing apparatuses have been known in which invariable fixed data, such as an identification number and the like, which are already determined in the production process of each printer are stored in a storage means, such as a ROM (read-only memory) or the like, and stored information is read from the storage means and is output to an external apparatus whenever necessary. In addition, in some apparatuses, when an abnormality, such as a jam of a recording medium, or consumption of all the ink or the ink sheet, occurs, the fact is displayed on a display unit provided in the printing apparatus.

Japanese Patent Application Laid-Open No. 58-109926/1983 discloses a configuration of identifying the state of abnormality which has occurred in the main body of a printing apparatus and transmitting the identified state to an external apparatus or the like.

In the printing apparatus which stores fixed data, the state of the apparatus when it has been shipped can be confirmed by reading the fixed data. In the printing apparatus which catches the occurences of abnormalities, the nature of the abnormality can be confirmed. However, none of the above-described printing apparatuses can confirm the state of the apparatus at an arbitrary time in the past. That is, the above-described conventional apparatuses can permit the user to confirm only the present state of the apparatus, but cannot store and output a record of all such occurrences in the machine past history, either singly or collectively.

Accordingly, the user cannot analyze how much of the printing apparatus's useful life has been used, up to the present, or to which extent the apparatus will be able to be used in future. That is, although it has become important for the user to control the state of a printing apparatus, as the user wishes to utilize the printing apparatus to the limit of durability, as maintenance-free as possible (in accordance with the recent tendency to use small personal printing apparatuses), a fully suitable method for that purpose has not yet been established.

SUMMARY OF THE INVENTION

It is an object of the present invention to provide a printing apparatus capable of appropriately notifying the user of the state of use by processing all of past information relating to the use of the apparatus.

According to one aspect, the present invention which achieves the above-described object relates to a printing apparatus for printing an image on a printing medium using a print head, including an information collection unit for collecting information of use that changes while the printing apparatus being is used, a use-information storage unit for storing the information of use collected by the information collection unit, a reference-information storage unit for storing reference information to be compared with the information of use, and a notification unit for providing notification of the information of use and the reference information based on a user's instruction.

According to another aspect, the present invention which achieves the above-described object relates to a printing apparatus for printing an image on a printing medium using a print head, including an information collection unit for collecting information of use that changes while the printing apparatus is being used, a use-information storage unit for storing the information of use collected by the information collection unit, a timer unit for counting an elapsed time period, a calculation unit for calculating an amount of change per predetermined elapsed time period of the information of use stored in the use-information storage unit, and notification unit for providing notification of a result of calculation of the calculation unit.

According to still another aspect, the present invention which achieves the above-described object relates to a method for controlling print information in a printing apparatus for printing an image on a printing medium using a print head, including the steps of collecting information of that changes while the printing apparatus is being used, storing the information of use collected in the information collecting step, providing a reference-information storing unit for storing reference information to be compared with the information of use, and providing notification of the information of use and the reference information based on a user's instruction.

According to yet another aspect, the present invention which achieves the above-described object relates to a method for controlling information in a printing apparatus for printing an image on a printing medium using a print head, including the steps of collecting information of user that changes while the printing apparatus is being used, storing the information of use collected in the information collecting step, counting an elapsed time period, calculating an amount of change per predetermined elapsed time period of the information of use, and providing notification of a result of calculation obtained in the calculating step.

According to the present invention, by collecting information of use that changes while a printing apparatus is being used, such as the amount of used sheets of a printing medium, and the like, and providing notification of a result of comparison between the information of use and reference information, and a notification of the amount of change per unit elapsed time period of the information of use, and appropriate information of use of the printing apparatus based on past accumulated data is provided to the user.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 4 through 7 are diagrams each illustrating a result of notification of information in the printing apparatus of the first embodiment;

DESCRIPTION OF THE PREFERRED EMBODIMENTS

The preferred embodiments of the present invention will now be described in detail with reference to the drawings.

First Embodiment

First, a first embodiment of the present invention will be described in detail.

Figure 8:
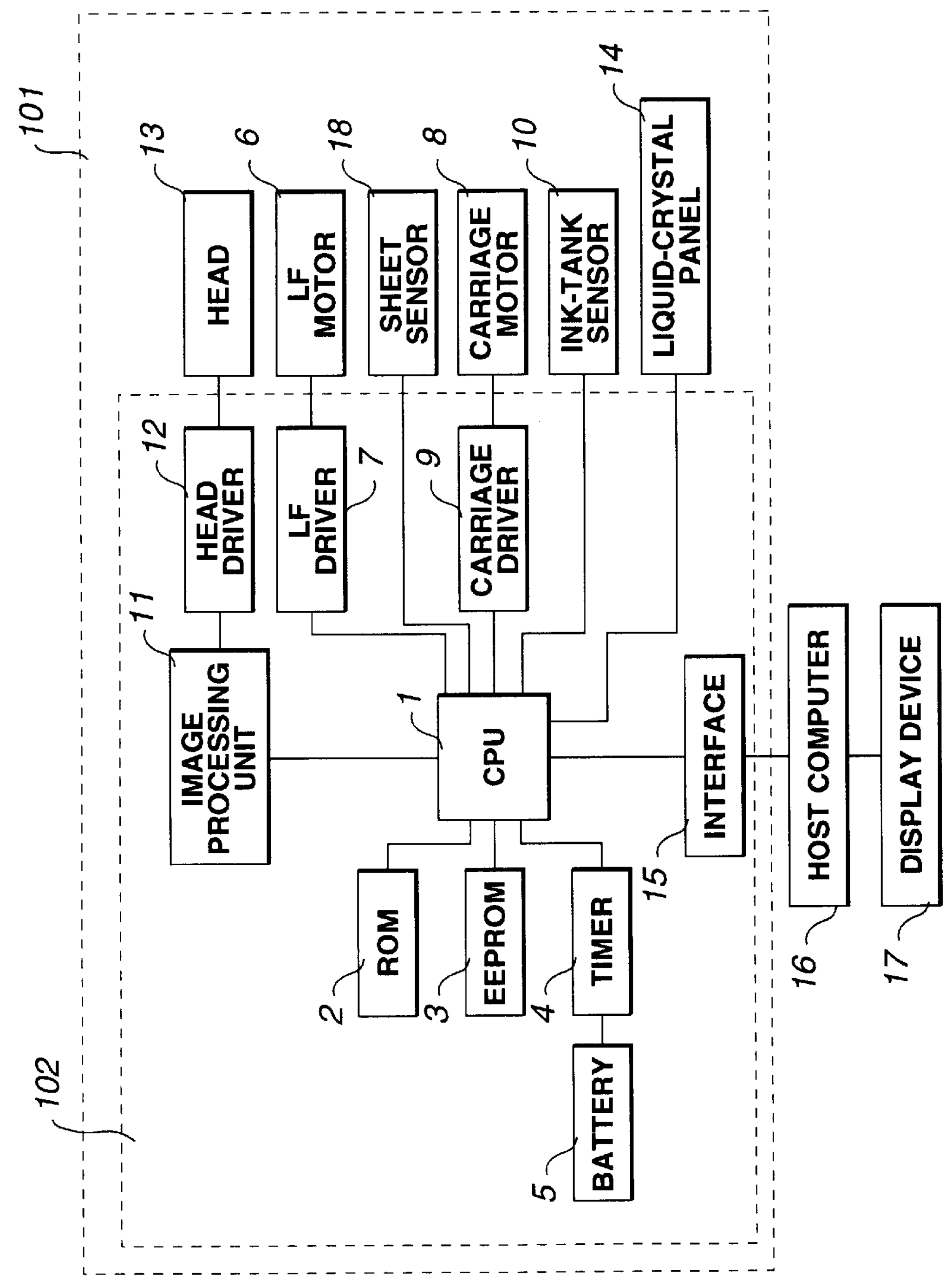
FIG. 8 is a block diagram illustrating the configuration of a control system of an ink-jet printing apparatus to which the present invention can be applied.

FIG. 8 is a block diagram illustrating the component of a control system of a printing apparatus to which the present invention can be applied.

The first embodiment will be described with reference to a printing apparatus that uses an ink-jet recording method.

The ink-jet printing apparatus includes an ink-jet head for discharging ink droplets, and an ink tank for storing ink to be supplied to the ink-jet head. The ink tank communicates with the ink-jet head so that a liquid flows via an ink channel. The ink-jet head has discharging ports for discharging the ink, and elements for generating discharging energy for discharging the ink. For example, heating elements for supplying ink with thermal energy, or piezoelectric elements for discharging ink by applying mechanical pressure to it are used as the energy generation elements.

Although the present invention can be applied to any type of ink-jet method, the description of the present embodiment will relate to the so-called bubble-jet method, in which electrothermal transducers, serving as theremal-energy generation elements, are used as discharging means.

In FIG. 8, there are shown a CPU (central processing unit) 1, such as a microprocessor or the like, a ROM (read-only memory) 2 storing control programs for the CPU 1 and various kinds of data, and EEPROM (electrically erasable and programmable ROM) 3 for sequentially updating and storing various kinds of changing data. A timer 4 measures time. A battery 5 supplies the timer 4 with electric power even when the power supply of the printing apparatus is turned off. An LF (line feed) motor 6 feeds a recording sheet of a recording medium (printing medium). An LF driver 7 drives the LF motor 6 for controlling the amount of movement of the recording sheet. A sheet sensor 18 detects the positions of the leading edge (tip of the recording sheet) and the trailing edge of the recording sheet. A carriage motor 8 moves a carriage mounting the print head and the ink tank. A carriage driver 9 drives the carriage motor 8 for controlling the amount of movement of the carriage by driving the carriage motor 8. An ink-tank sensor 10 detects the mounting/detaching of the ink tank. In the first embodiment, the mounting/detaching of the ink tank is detected using a reflection-type photosensor. An image processing unit 11 performs image processing for forming an image. A head driver 12 drives the print head according to information from the image processing unit 11. An ink-jet print head (hereinafter termed an "ink-jet head" or a "recording head") forms an image on a recording sheet by discharging ink droplets based on a signal from the head driver 12. A liquid-crystal panel 14 displays the state of the printing apparatus. An interface 15 exchanges information between a host computer 16, serving as a higher-hierarchy apparatus, and the printing apparatus. A display device 17 displays characters, images and the like according to a display instruction from the host computer 16. The components within the dotted-line frame 101 are included within the, printing apparatus, and the components within the dotted-line frame 102 are arranged on an electronic-component substrate within the printing apparatus.

Figure 9:
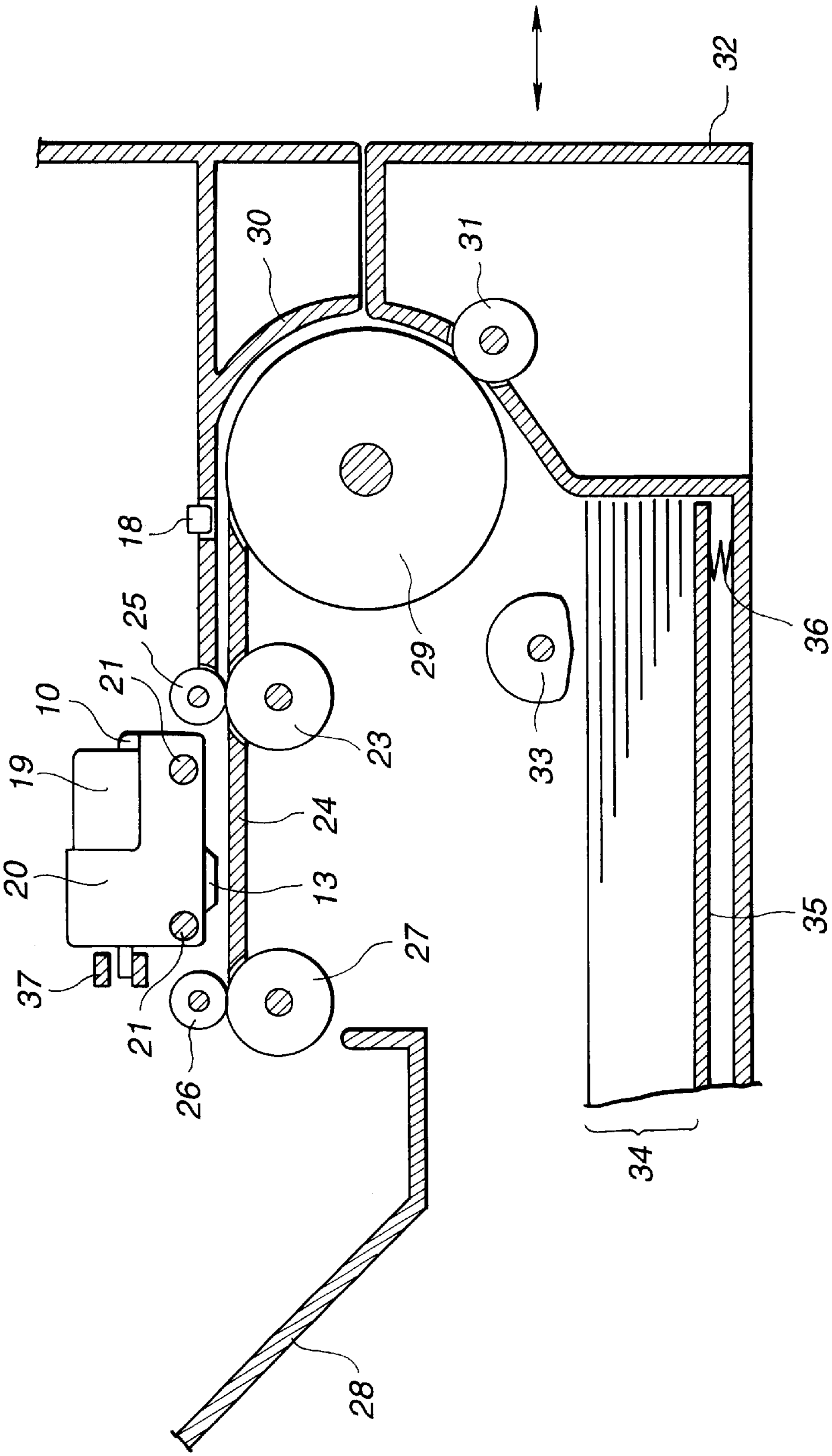
FIG. 9 is a cross-sectional view illustrating the mechanical configuration of the ink-jet printing apparatus to which the present invention can be applied.
Figure 10:
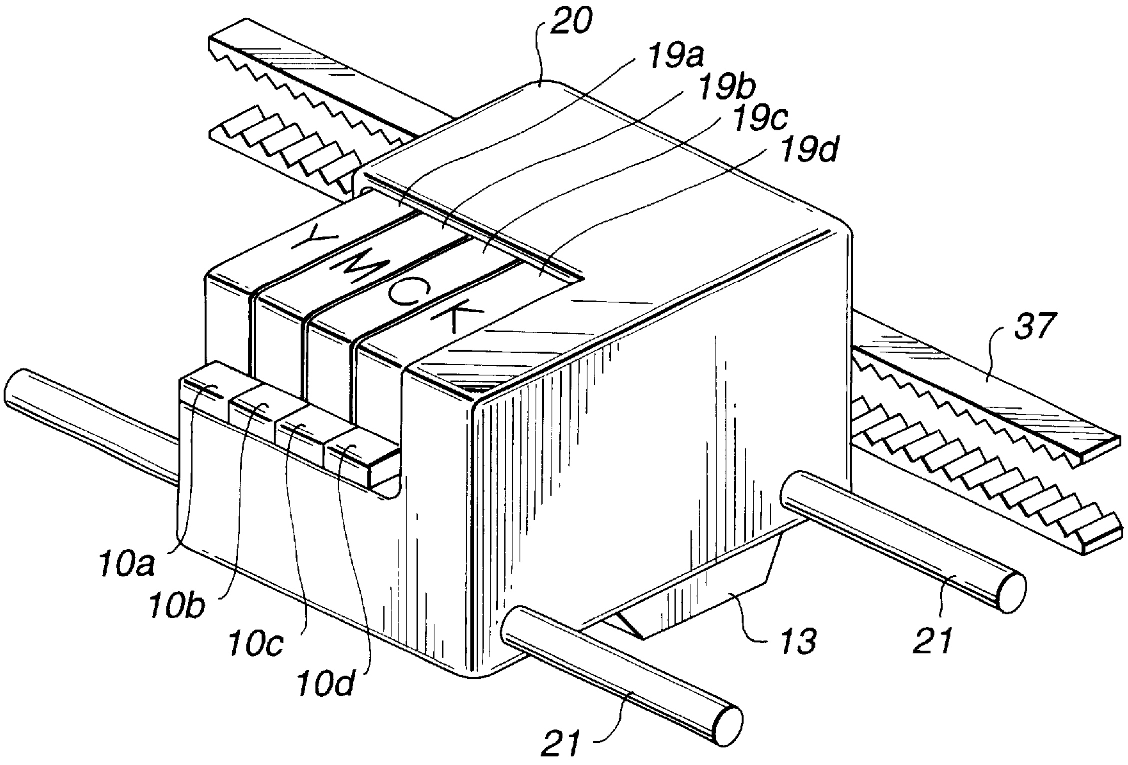
FIG. 10 is an enlarged perspective view illustrating a carriage portion shown in FIG. 9.

Next, a description will be provided of the mechanical configuration of the ink-jet printing apparatus of the first embodiment with reference to FIGS. 9 and 10.

In FIGS. 9 and 10, recording sheets 34 are accommodated on a sheet feeding tray 35 within a sheet feeding cassette 32 detachably mounted in the main body of the printing apparatus. When feeding the recording sheets 34, the uppermost recording sheet 34 is brought into pressure contact with a sheet feeding roller 33 by a spring 36. The sheet feeding roller 33 is a roughly semicylindrical roller, and is rotatably driven by an LF motor (not shown) to feed only the uppermost recording sheet 34 in cooperation with a separation pawl (not shown).

The conveying direction of the separated and fed recording sheet 34 is subjected to a U-turn along a conveying surface provided by the sheet feeding cassette 32 and a sheet guide 30 by an intermediate roller 29 and an intermediate subroller 31 in pressure contact therewith. Then, the recording sheet 34 is conveyed to a recording portion by being fed by a predetermined amount by a main conveying roller 23 and a pinch roller 25 in pressure contact therewith. The sheet sensor 18 is a reflection-type photosensor, and controls the position of the recording sheet 34 and the number of conveyed sheets by detecting the positions of the leading edge and the trailing edge of the recording sheet 34.

A serial ink-jet recording method is adopted as the recording method in the printing apparatus of the first embodiment. In FIG. 10, ink tanks 19*a*–19*d* store yellow, magenta, cyan and black ink liquids to be supplied to the print head 13. A carriage 20 mounting the ink tanks 19*a*–19*d* is reciprocated along two guide shafts 21 extending in the lateral direction of the recording sheet 34 by a carriage belt 37 driven by a carriage motor (not shown). By driving the print head 13 in synchronization with the reciprocated movement of the carriange 20, ink droplets are discharged from the print head 13 toward the recording sheet 34 to form an image with the ink. Sensor elements 10*a*–10*d* of the ink-tank sensor 10 are disposed at positions facing the ink tanks 19*a*–19*d*, respectively. In the first embodiment, a reflection-type sensor is used for each of the sensor elements 10*l*–10*d* to detect the presence of the corresponding one of the ink tanks 19*a*–19*d*. The recording sheet 34 which has been fed and on which the image has been formed in the above-described manner is conveyed and discharged by a sheet feeding roller 27 and a spur (not shown) or a cooperating roller 26 in pressure contact therewith, and is stacked on a discharged-sheet tray 28.

Next, the processing in the printing apparatus of the first embodiment will be described with reference to the flowchart shown in FIG. 1. First, in step S1, it is determined whether a recording sheet 34 has been used. In this process, when the sheet sensor 18 has detected the leading edge and then the trailing edge of a recording sheet 34, the printing apparatus determines that a recording sheet 34 has been conveyed. If the result of the determination in step Si is affirmative, the process proceeds to step S2, where a number of passed sheets P, stored in the EEPROM 3, is updated, i.e., incremented by one. Then, in step S3, it is determined whether a command to confirm the number of passed sheets from the user is present. Upon provision of such a command by the user, for example, from the host computer 16 whenever necessary, the processes of steps S4–S8 are performed, in which information relating to a guaranteed number of passed sheets stored in a storage means, such as the ROM 2 or the like, and information relating to the number of passed sheets P stored in the EEPROM 3, are read and transmitted to the host computer 16. At that time, as shown in steps S6–S8, for example, an average number of sheets used per month can be calculated by referring to the value of the timer 4 (step S7), and the calculated value can be transmitted to the host computer 16. More specifically, if, for example, 60 recording sheets 34 have been printed in three months, the average number of recording sheets 34 used per month is 60÷3=20. Then, in step S9, the information is transmitted to the host computer 16 and a result as shown in FIG. 2 is displayed on the display device 17.

Figure 2:
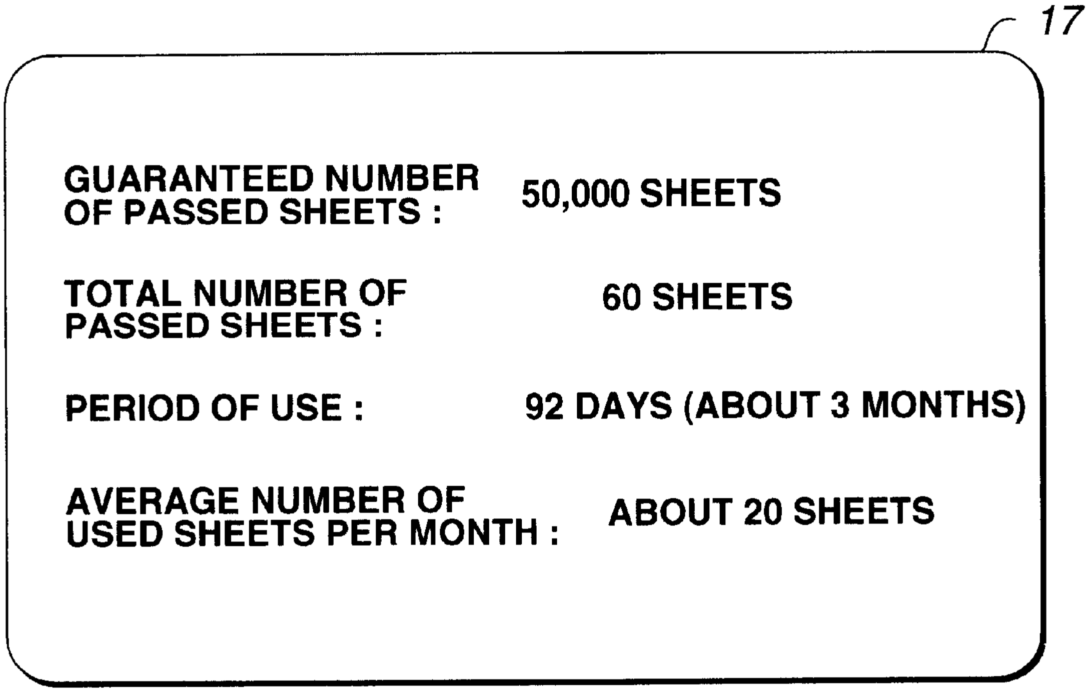
FIG. 2 is a diagram illustrating a result of notification of information in the printing apparatus of the first embodiment.

By providing such a display, for example, when using a package of 200 sheets dedicated for ink-jet printing as the recording sheets 34, the user can easily understand from the display on the display device 17 shown in FIG. 2 that it is only necessary to purchase one pack of such sheets about every 10 months. Furthermore, by storing a value guaranteed by the maker for the total number of used recording sheets 34 in the ROM 2 and simultaneously transmitting and displaying this value on the display device 17, the user can easily understand to which extent the printing apparatus has been used and to which extent the printing apparatus will be able to be assuredly used from now on. The guaranteed value for the total number of used recording sheets 34 is, for example, a value set as the number of conveyed recording sheets 34 until the conveying unit has served its full expected life.

Figure 3:
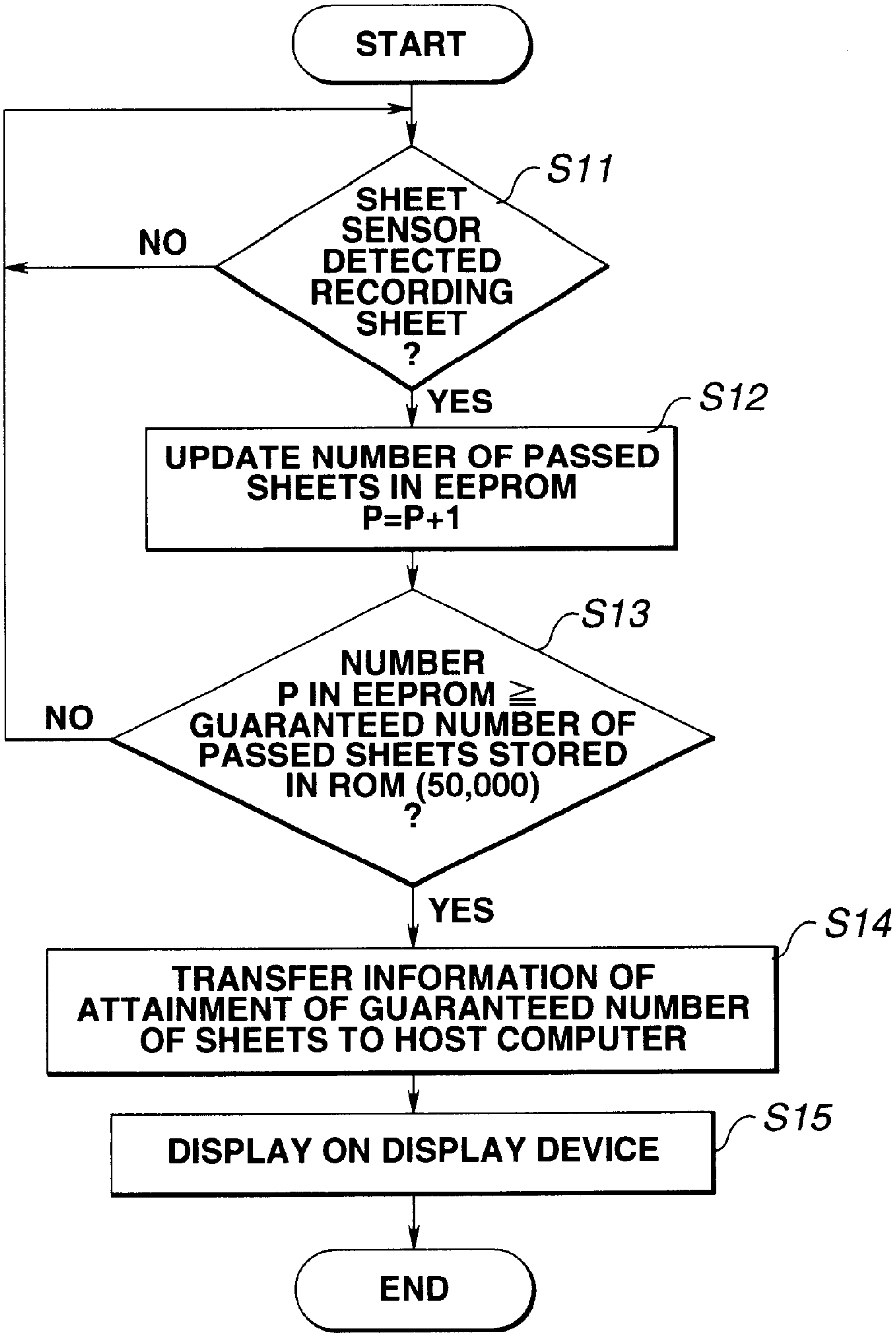
FIG. 3 is a flowchart illustrating an operation of automatically notifying information in the printing apparatus of the first embodiment.
Figure 4:
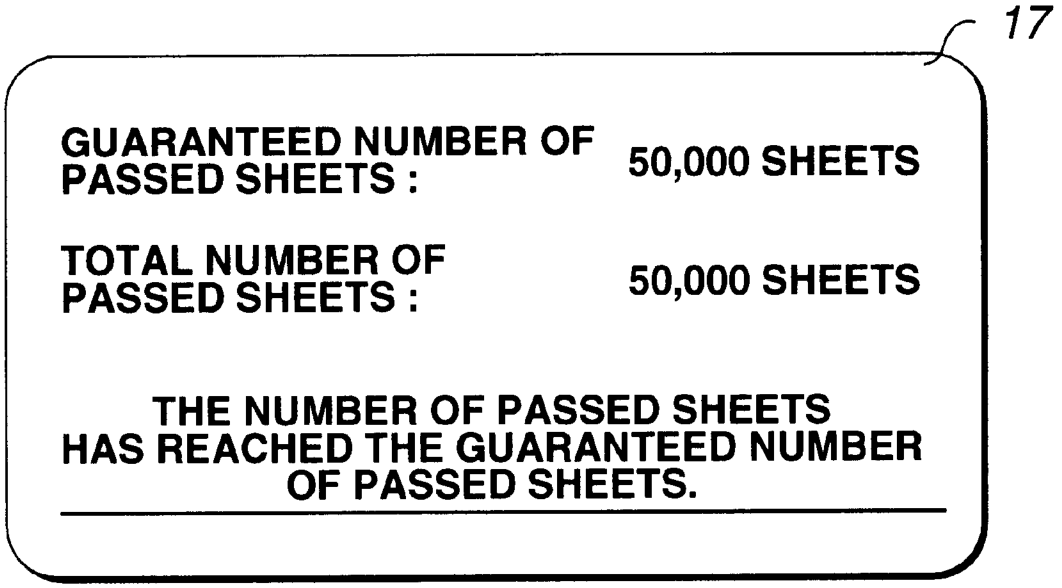

In another approach, as shown in the flowchart of FIG. 3, the number of passed sheets P sequentially updated and stored in the EEPROM 3 in steps S11 and S12 may be compared with the value guaranteed by the maker for the total number of passed recording sheets 34 stored in the ROM 2 every time the value P in the EEPROM 3 is updated (step S13). When the value P reaches the guaranteed value, that information may be automatically transferred to the host computer 16 and may be displayed on the display device 17 (steps S14 and S15). FIG. 4 illustrates an example of display on the display device 17 at that time. From the contents of such a display, the user can know from the frequency of use that the cumulative amount of use of the printing apparatus has reached an amount corresponding to the number of recording sheets guaranteed by the maker, so that, for example, the user can recognize the necessity of replacement of components of the apparatus or can utilize the information in deciding when to buy a new apparatus. Because of the display of such information, the possibility that the printing apparatus may abruptly assume a state of incapability of repair while being used, is reduced. At that time, it is possible to transmit information to the user more assuredly performing notification by voice, using notification means such as a speaker or the like. Since information relating to the state of use of a printing apparatus can be obtained, the user can know the state of use of the printing apparatus which has been used to a certain extent and avoid trouble, for example, when trading a secondhand printing apparatus.

Similarly, the degree of use of the print head 13 can be known. A description will now be provided of a configuration for controlling the frequency of use of the print head 13.

When controlling the frequency of use of the print head 13, the degree of use of the print head 13 can be known by sequentially accumulating the number of driving signals generated by the head driver 12 and controlling the obtained value. In the first embodiment, since a plurality of print heads are provided for respetive ink colors, the degree of use of the print head 13 for respective ink colors can be controlled by sequentially adding discharging signals for discharging ink from the print head 13 for each color, storing the obtained value in the EEPROM 3 as the total number of discharging operations of the corresponding head for the color, and updating the stored value at every printing operation. When there is a command to confirm the state of use of the print head 13 from the host computer 16 or the like, the stored information may be transferred to the host computer 16 and displayed on the display device 17. FIG. 5 illustrates an example of display on the display device 17 at that time. Furthermore, when the number of discharging operations for a head corresponding to any ink color exceeds the value guaranteed by the maker, that information may be automatically transferred to the host computer 16 and displayed on the display device 17, as in the above-described case of FIG. 4. FIG. 6 illustrates an example of display on the display device 17 at that time. As described above, the user can know if the amount of use of the heads corresponding to all of the ink colors is still within the guaranteed operation range.

It is also possible to know the frequency with which any of the ink tanks 19*a*–19*d* are exchanged. A description will now be provided of a configuration for monitoring the use of ink in order to know the frequency of ink tank exchanges.

In order to know the frequency of ink tank exchanges, every time the ink-tank sensor 10 has detected mounting/detaching of one of the ink tanks 19*a*–19*d* for a respective ink color, the number of mounting/detaching operations is sequentially accumulated as the number of such operations for that one of the ink tanks 19*a*–19*d*. Information relating to the number of ink tank exchanges is controlled by being stored in the EEPROM 3, and is updated at every such exchange.

In response to the transmission of a command to confirm the state of use, provided by the user from the host computer 16 whenever necessary, the number of exchange operations is transmitted to the host computer 16, or the average used number of each of the ink tanks 19*a*–19*d* per month is calculated and transmitted to the host computer 16. For example, when the numbers of exchanges of the ink tank 19*a* for yellow ink, the ink tank 19*b* for magneta ink, the ink tank 19*c* for cyan ink and the ink tank 19*d* for black ink are 6, 4, 5 and 13, respectively, the result of display on the display device 17 is as shown in FIG. 7. The contents of the display in FIG. 7 indicate that the used numbers of each of the ink tanks 19*a*–19*c* and the ink tank 19*d* per month are 2 and 5, respectively. It can be understood that the user is only required to prepare the respective ink tanks to be exchanged based on this information.

In the above-described configuration, it is preferable that the EEPROM 3 is mounted on the electronic-component substrate not by direct soldering, but using a socket. By mounting the EEPROM 3 in this fashion, data stored in it is not lost by remounting the EEPROM 3 on a new substrate even if the electronic-component substrate fails. When using a RAM (random access memory) instead of an EEPROM 3, by supplying electric power to the RAM from the battery 5 as to the timer 4, various kinds of updated data within the RAM are not lost even when the power supply of the main body of the printing apparatus is turned off.

As described above, in the first embodiment, the user can read information relating to the state of use of the printing apparatus, such as the number of used recording sheets 34, the number of discharging operations of the print head 13, and the like, from accumulated past data whenever necessary, so that the user can determine by himself the state of the printing apparatus. When the printing apparatus is used to an extent exceeding the guaranteed amount of use, the user is automatically notified of the fact until the printing apparatus reaches the end of life, so that the possibility the printing apparatus abruptly becoming incapable of being used, can be reduced. Such information may also be used as a criterion for the time of replacement of components within the printing apparatus or the time of replacement of the printing apparatus itself. Furthermore, by transmitting mean values calculated in accordance with the time period of the use of the printing apparatus for the number of operations of exchanging ink tanks for storing ink and the number of used recording sheets to the user, it is also possible to estimate respective times of replenishment of consumable supplies, such as ink, recording sheets and the like. As a result, it is possible to provide a printing apparatus which can be easily controlled by the user wherein interruption of operations due to consumption of consumable supplies can be prevented, while unnecessary use of space and advance expenditure for storing surplus consumable supplies can be minimized.

By providing a function of clearing data stored in the EEPROM 3 by a signal from the host computer 16 or by a signal from a switch or the like provided in the printing apparatus, for example, it is possible to reset data relating to the state of use of the print head 13 stored in the EEPROM 3 when exchanging the print head 13 and also to obtain exact information after exchanging the print head 13.

Figure 1:
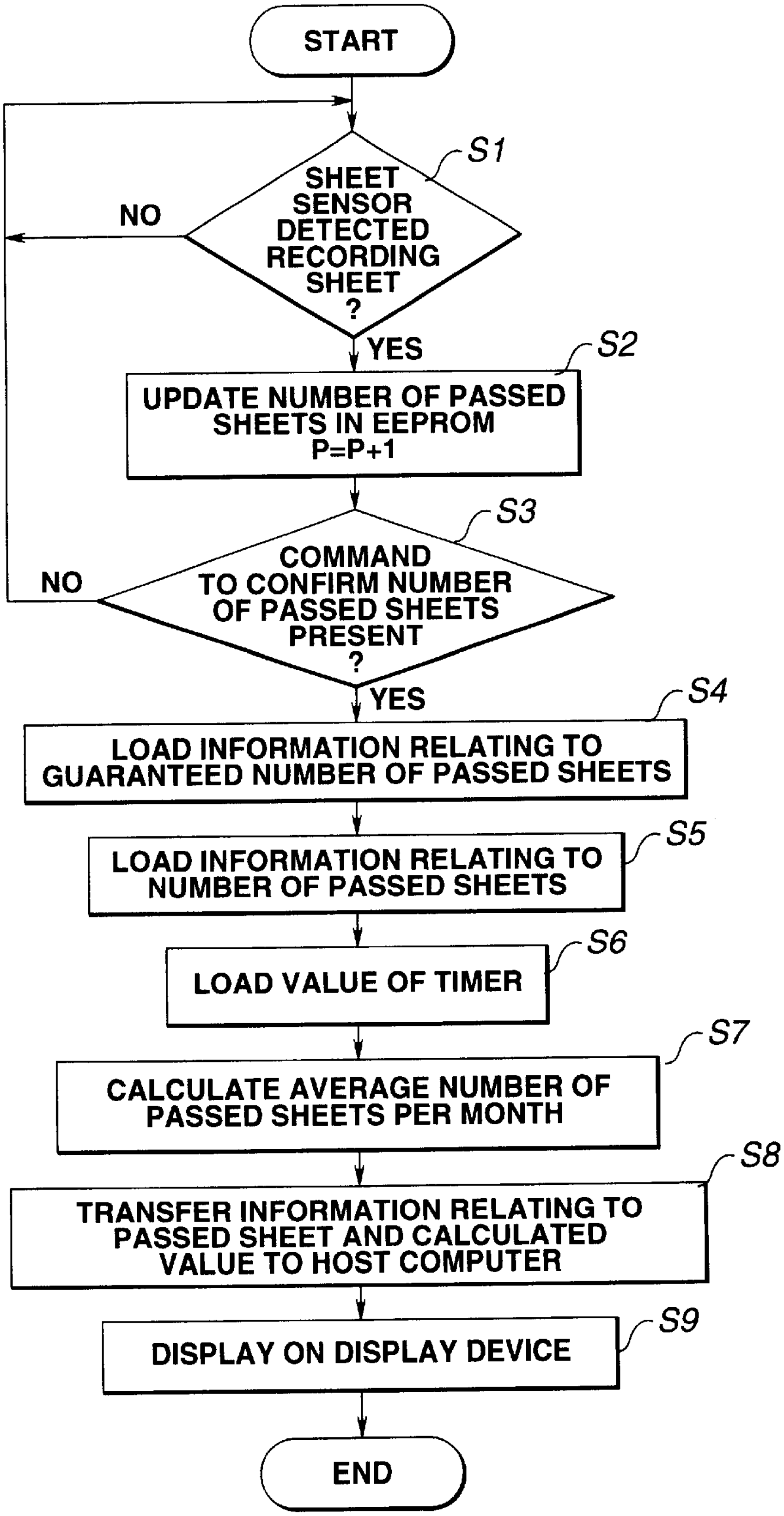
FIG. 1 is a flowchart illustrating an information notifying operation in a printing apparatus according to a first embodiment of the present invention.

In FIG. 1, while the case of determining whether a command to confirm the number of passed sheets is present (step S3) after updating data of the number of passed sheets in step S2 has been illustrated, the present invention is not limited to such a case. For example, it may be to determined at any time whether the command is present. Alternatively, when a command to confirm the number of passed sheets is provided while a printing operation is interrupted, an operation of displaying information relating to the number of passed sheets may be executed immediately or after completing a predetermined printing operation.

In the configuration of the first embodiment, display and confirmation of information relating to the state of use of the printing apparatus, such as the number of passed sheets, or the like, can be performed via the host computer. Even when the main body of the printing apparatus is installed and used at a location separated from the host computer operated by the user, or when the printing apparatus is shared via a network, the user can instruct execution of a command whenever necessary, and can confirm information in the host computer operated by the user.

Second Embodiment

Next, a description will be provided of a second embodiment of the present invention.

In the first embodiment, by transferring various kinds of information to the host computer 16, information is displayed on the display device 17. In the second embodiment, however, the information can be transmitted by displaying it on a liquid-crystal panel 14 (see FIG. 8) provided in the printing apparatus. A speaker may also be provided in the printing apparatus. By producing some kind of sound using the speaker when the printing apparatus automatically displays various kinds of information, the user can immediately know the information.

Particularly, in accordance with a recent tendency to use small personal printing apparatuses, a printing apparatus is often placed in the vicinity of the user. In such a case, it is effective to display information on the liquid-crystal panel 14, serving as a display device provided in the printing apparatus.

A command to confirm the number of passed sheets may also be entered by depressing a button, such as a display button or the like, provided in the printing apparatus. In such a case, it is possible to provide a command to display information from the printing apparatus. Hence, even if the printing apparatus is not connected to the host computer, or if the printing apparatus is in an off-line state, it is possible to display and confirm information relating to the state of use of the printing apparatus whenever necessary.

Third Embodiment

Next, a third embodiment of the present invention will be described.

In the third embodiment, a test printing mode is provided as a mode for confirming the operation of the printing apparatus in addition to the configurations described in the first and second embodiments.

The second embodiment has the effect that the printing apparatus can confirm various kinds of information by itself by displaying the information on the liquid-crystal panel 14, serving as a display device provided in the printing device. In the third embodiment, however, by setting a test printing mode as an operational mode of the printing apparatus, it is also possible to record information relating to various states of use of the printing apparatus on a recording sheet when test printing is executed, and to preserve the recording result.

The test printing mode may, for example, be executed by depressing a switch, such as a "test printing button" or the like, provided on the printing apparatus to record various kinds of information on a recording sheet.

For example, a pattern for confirming the state of the nozzles of an ink-jet head, a pattern for confirming or adjusting recording positions by a plurality of recording heads, and a pattern for confirming recording colors are generally known as test printing patterns. By printing various kinds of information together with such a test printing pattern and referring to the state of use of the printing apparatus and the printed results, the user can easily know the state of the printing apparatus.

Particularly, when it becomes clear by referring to a predetermined test pattern that an error has been produced at the recording position, it is possible to estimate whether the problem has occurred due to changes in mechanical components or the like during use over a long period, or whether some kind of abnormality has occurred during use over a short period, and also to use the test pattern as a criterion for determining countermeasures against the problem.

As described above, according to the present invention, by collecting information of that changes while a printing apparatus is being used, such as the cumulative usage of sheets of a printing medium, and the like, and notifying an operator of a result of comparison between the information of use and reference information, and the amount of change per unit elapsed time of the information of use, the user can be provided with appropriate information relating to use of the printing apparatus, based on past accumulated data.

Furthermore, the user can determine by himself the state of the printing apparatus by reading the number of used recording sheets of a printing medium, the number of operations of the print head, and the like from accumulated past data. When the printing apparatus is used to an extent exceeding the guaranteed amount of use, the user is automatically notified of the fact, so that the possibility of the printing apparatus abruptly becoming incapable of being used, can be reduced. It is also possible to notify the user of that it is time to exchange components within the apparatus, or time to exchange the apparatus itself, so that such information can be used as a criterion for the time to purchase a new printing apparatus.

Furthermore, by transmitting mean values within a predetermined time period for the number of operations of exchanging ink tanks exchangeably provided for an ink-jet head, and the number of used sheets of a printing medium, to the user, it is also possible to estimate respective times of replenishment of consumable supplies will become necessary. As a result, it is possible to minimize the stock of consumable supplies without interrupting operations due to consumption of consumable supplies, and to minimize unnecessary use of space and an advance expenditure for storing surplus consumable supplies.

Other Embodiments

The present invention has excellent effects when used with an ink-jet recording method of performing recording on a recording medium by discharging ink. In the ink-jet recording method, by controlling the used amount of ink serving as a recording material, and information relating to the state of use of the recording head, the operation of the recording apparatus can be highly reliable, so that the application of the present invention to this method is very effective.

According to an ink-jet recording method using a printing apparatus (recording apparatus) which includes means for generating thermal energy to be utilized for discharging ink (for example, electrothermal transducers, a laser beam or the like), and a print head (recording head) for causing a change in the state of ink by means of the thermal energy, high-density and very precise recording can be achieved. Hence, such a method is an excellent recording method. The present invention can also be effectively applied to such an ink-jet recording method.

Typical configurations and principles of an ink-jet recording method using thermal-energy generation means for generating energy for discharging ink are disclosed, for example, in U.S. Pat. Nos. 4,723,129 and 4,740,796. The disclosed method can be applied to both of so-called on-demand type and continuous type. Particularly, the on-demand type is effective because by applying at least one driving signal for causing a rapid temperature rise exceeding nucleate boiling to an electrothermal transducer disposed so as to face a sheet holding a liquid (ink), or a liquid channel in accordance with recording information, thermal energy is generated in the electrothermal transducer, to cause film boiling on the heat operating surface of the recording head, and to form a bubble within the liquid (ink) corresponding to the driving signal. By discharging the liquid (ink) from the discharging opening due to the growth and contraction of the bubble, at least one droplet is formed. It is preferable to provide the driving signal in the form of a pulse because the bubble can be instantaneously and appropriately grown and contracted, and the, discharging of the liquid (ink) with a high response speed can be achieved. A pulse-shaped driving signal such as ones described in U.S. Pat. Nos. 4,463,359 and 4,345,262 is suitable. By adopting conditions described in U.S. Pat. No. 4,313,124 relating to the rate of temperature rise of the heat operating surface, more excellent recording can be performed.

In addition to the configuration of combining discharging ports, a liquid channel and electrothermal transducers (a linear liquid channel or an orthogonal liquid channel) as disclosed in the above-described patents, configurations described in U.S. Pat. Nos. 4,558,333 and 4,459,600, in which a heat operating unit is disposed at a bending region, may also be adopted for the recording head of the present invention. In addition, the present invention is also effective for a configuration disclosed in Japanese Patent Application Laid-Open No. 59-123670/1984, in which a common slit is used as a discharging port for a plurality of electrothermal transducers, and to a configuration disclosed in Japanese Patent Application Laid-Open No. 59-138461/19841, in which an aperture for absorbing the pressure wave of thermal energy is used as a discharging port. That is, according to the present invention, recording can be assuredly and efficiently performed irrespective of the form of the recording head.

The present invention is also effective for a full-line-type recording head having a length corresponding to the maximum width of a recording medium which can be recorded by the recording apparatus. Such a recording head may have a configuration of covering the length by means of a plurality of recording heads, or may be a single integrally formed recording head.

Furthermore, the present invention is also effective for serial-type heads as described above, for example, a recording head fixed to the main body of the apparatus, an exchangeable chip-type recording head capable of electric connection to the main body of the apparatus and ink supply from the main body of the apparatus by being mounted on the main body of the apparatus, and a cartridge-type recording head having an ink tank provided as one body therewith.

The addition of means for recovering a discharging operation of the recording head, preliminary auxiliary means and the like is preferable because the effects of the present invention can be further stabilized. More specifically, these means include capping means, cleaning means, and pressing or suctioning means for the recording head, preliminary heating means for performing heating using an electrothermal transducer, a heating element other than the electrothermal transducer, or a combination of these elements, and preliminary discharging means for performing discharging other than recording.

As for the kind or the number of recording heads to be mounted, for example, a single head for monochromatic ink, or a plurality of heads for a plurality of ink liquids having different colors and density values may be used. That is, the present invention is very effective for a recording mode using a single color, such as black or the like, an integrally formed recording head, a combination of a plurality of recording heads, and a recording apparatus which has at least one of a recording mode using a plurality of different colors and a recording mode of obtaining a full-color image by mixing colors.

Although in the foregoing embodiments, a description has been provided illustrating ink in the form of a liquid, ink which is solidified at a temperature equal to or lower than the room temperature and is softened or liquidized at the room temperature may also be used. In the ink-jet method, ink itself is generally subjected to temperature control within a range of 30° C.–70° C. so that the viscosity of the ink is within a range of stable discharge. Hence, ink which is liquified when providing a recording signal may also be used. Furthermore, in order to prevent temperature rise due to thermal energy by using the energy for liquifying ink from a solidified state or to prevent evaporation of ink, ink which is usually solid and is liquified by being heated may also be used. Anyway, the present invention can also be applied to a case in which ink is liquified by providing thermal energy corresponding to a recording signal and the liquified ink is discharged, and to a case of using ink which is liquified by providing thermal energy and starts to be solidified when it reaches a recording medium. As disclosed in Japanese Patent Laid-Open Applications (Kokai) Nos. 54-56847 (1979) and 60-71260 (1985), such ink may be provided so as to face an electrothermal transducer while being held in recesses or threaded holes of a porous sheet in a liquid or solid state. In the present invention, the above-described film boiling method is most effective for the above-described ink.

The present invention may be applied to an image output terminal of an information processing apparatus, such as a computer or the like, a copier combined with a reader and the like, a facsimile apparatus having a transmission/reception function, and the like.

The individual components shown in outline or designated by blocks in the drawings are all wellknown in the printing-apparatus control method and printing apparatus arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus that prints an image using a print head based on image data provided by a host apparatus connected to an external apparatus, said apparatus comprising:

guarantee-information storage that stores information of guarantee for guaranteeing the performance of said printing apparatus, wherein guarantee-information is information relating to the guaranteed number of the print media being used or the guaranteed performance number of the print head;

information obtaining means for obtaining information of use relating to cumulative use of said printing apparatus, and to be compared with the information of guarantee, wherein the information of use is the information relating to the number of print media used for printing or the number of performances of the print head;

use-information storage that stores the obtained information of use; and notification means for notifying a user of cumulative use of said printing apparatus in accordance with the information of use and the information of guarantee, when the user instructs a command for confirmation via the host apparatus, wherein said notification means reads information stored in said guarantee-information storage and said use-information storage based on the instruction by the user.

2. A printing apparatus according to claim 1, wherein said information obtaining means acquires an accumulated number of operations of the print head as the information of use, and wherein said reference-information storage means stores a guaranteed number of operations of the print head.

3. A printing apparatus according to claim 1, wherein said information obtaining means acquires an accumulated number of used sheets of the printing medium as the information of use, and wherein said reference-information storage means stores a guaranteed number of used sheets of the printing medium.

4. A printing apparatus according to claim 1, wherein said printing apparatus performs a printing operation based on an instruction from a connected host apparatus, wherein the user's instruction is performed via the host apparatus, and wherein said notification means provides notification to the user by transmitting the information of use and the reference information to the host apparatus.

5. A printing apparatus according to claim 1, further comprising:

comparison means for comparing the information of use stored in said use-information storage means with the reference information stored in said reference-information storage means, wherein said notification means notifies the user of a result of comparison obtained by said comparison means.

6. A printing apparatus according to claim 5, further comprising:

automatic notification means for automatically causing said notification means to notify the user of the information of use and the reference information based on the result of comparison obtained by said comparison means.

7. A printing apparatus according to claim 1, wherein the print head comprises discharging ports for discharging ink, and wherein the image is printed on the printing medium by discharging the ink from said discharging ports.

8. A printing apparatus according to claim 7, wherein the print head comprises thermal-energy generation means for providing the ink with thermal energy, and wherein a bubble is generated within the ink by the thermal energy to discharge the ink from a corresponding one of the discharging ports by the generation of the bubble.

9. A printing apparatus for printing an image on a printing medium using a print head, said apparatus comprising:

information obtaining means for obtaining information of use relating to cumulative use of said printing apparatus while said printing apparatus is being used, wherein the information of use is the information relating to the number of print media used for printing or the number of performances of the print head, and wherein said printing apparatus is connected to a host apparatus;

use-information storage that stores the obtained information of use;

a timer for counting an elapsed time period, wherein the elapsed time is accumulated and the accumulated time is used to calculate the average use;

calculation means for calculating an average use amount of said printing apparatus on the basis of said information of use and a predetermined elapsed time period; and notification means for notifying a user of a result of calculation obtained by said calculation means, wherein, when a user requests via a host apparatus, information in the memory is read, and the user is notified by outputting the information so as to display it in a display portion of the host apparatus.

10. A printing apparatus according to claim 9, wherein said notification means notifies the user of the result of calculations, based on the user's instruction.

11. A printing apparatus according to claim 9, wherein said notification means notifies the user of the information of use, the reference information, and the result of calculation.

12. A printing apparatus according to claim 9, wherein said information obtaining means acquires an accumulated number of used sheets of the printing medium as the information of use, and wherein said calculation means calculates a number of used sheets of the printing medium per predetermined time period.

13. A printing apparatus according to claim 9, wherein the print head comprises discharging ports for discharging ink, and wherein the image is printed on the printing medium by discharging the ink from said discharging ports.

14. A printing apparatus according to claim 13, further comprising:

an ink tank for holding the ink to be supplied to the print head and for supplying the print head with the ink by being exchangeably mounted on said printing apparatus, wherein said information obtaining means acquires an accumulated number of operations of exchanging said ink tank as the information of use, and wherein said calculation means calculates a number of operations of exchanging said ink tank per predetermined time period.

15. A printing apparatus according to claim 13, wherein the print head comprises thermal-energy generation means for providing the ink with thermal energy, and wherein a bubble is generated within the ink by the thermal energy to discharge the ink from a corresponding one of the discharging ports by the generation of the bubble.

16. A printing apparatus according to claim 9, wherein said notification means automatically provides notification to the user when the information of use satisfies predetermined conditions.

17. A printing apparatus according to claim 9, wherein said printing apparatus performs a printing operation based on an instruction from a connected external apparatus, and wherein said notification means provides notification to the user in response to a command to confirm the information of use, from the external apparatus.

18. A printing apparatus according to claim 17, further comprising:

transfer means for transferring the information of and the reference information to the external apparatus, wherein said notification means provides notification to the user by transmitting the information of use and the reference information to the external apparatus.

19. A printing apparatus according to claim 9, further comprising:

a display unit for displaying the information of use and the reference information notified by said notification means.

20. A printing apparatus according to claim 9, further comprising:

means for generating voice when the notification by said notification means has been received.

21. A printing apparatus according to claim 9, further comprising:

control means for causing the print head to print the result notified from said notification means.

22. A printing apparatus according to claim 9, wherein said use-information storage means is detachably provided on an electronic-component substrate within said printing apparatus.

23. A printing apparatus according to claim 9, further comprising:

means for clearing the information of use stored in said use-information storage means.

24. A printing apparatus according to claim 9, further comprising:

moving means for moving the print head in a main scanning direction; and conveying means for conveying the printing medium in a sub-scanning direction which is substantially orthogonal to the main scanning direction.

25. A method for notifying print information in a printing apparatus that prints an image using a print head based on image data provided by a host apparatus connected to an external apparatus, said method comprising the steps of:

storing information of guarantee for guaranteeing the performance of the printing apparatus, wherein information of guarantee is information relating to the guaranteed number of the print media being used or the guaranteed performance number of the print head;

obtaining information of use relating to cumulative use of the printing apparatus while the printing apparatus and to be compared with the information of guarantee, wherein the information of use is the information relating to the number of print media used for printing or the number of performing the print head;

storing the obtained information of use;

providing reference-information storage means for storing reference information to be compared with the information of use; and notifying a user of cumulative use of the printing apparatus in accordance with the information of use and the information of guarantee, when the user instruct a command for confirmation via the host apparatus, wherein, in said notifying step, the user is notified so as to read information stored in said guarantee-information storing step and the use-information storing step, based on the instruction by the user.

26. A method for notifying information in a printing apparatus for printing an image on a printing medium using a print head, said method comprising the steps of:

obtaining information of use related to cumulative use of the printing apparatus while the printing apparatus is being used, wherein the information of use is the information relating tot he number of print media used for printing or the number of performances of the print head, and wherein the printing apparatus is connected to a host apparatus;

storing the obtained information of use;

counting an elapsed time period, wherein the elapsed time is accumulated and the accumulated time is used to calculate the average use;

calculating an average use amount of the printing apparatus in a case of cumulative use of the printing apparatus on the basis of the information of use and a predetermined elapsed time period; and notifying a user of a result of calculation obtained in said calculating step, wherein, when a user requests via a host apparatus, information in the memory is read, and the user is notified by outputting the information so as to display it in a display portion of the host apparatus.

* * * * *